(12) United States Patent
Phogat et al.

(10) Patent No.: US 10,832,446 B2
(45) Date of Patent: Nov. 10, 2020

(54) BONE HANDLE GENERATION

(71) Applicant: Adobe Inc., San Jose, CA (US)

(72) Inventors: Ankit Phogat, Noida (IN); Vineet Batra, Pitam Pura (IN); Sumit Chaturvedi, Noida (IN); Mridul Kavidayal, Nainital (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/241,719

(22) Filed: Jan. 7, 2019

(65) Prior Publication Data

US 2020/0219287 A1 Jul. 9, 2020

(51) Int. Cl.
| | |
|---|---|
| *G06T 9/00* | (2006.01) |
| *G06T 11/40* | (2006.01) |
| *G06F 3/0484* | (2013.01) |
| *G06T 17/20* | (2006.01) |

(52) U.S. Cl.
CPC .......... *G06T 9/001* (2013.01); *G06F 3/04845* (2013.01); *G06T 11/40* (2013.01); *G06T 17/20* (2013.01)

(58) Field of Classification Search
CPC ..................................................... G06T 17/20
See application file for complete search history.

(56) References Cited

U.S. PATENT DOCUMENTS

| | | | |
|---|---|---|---|
| 5,611,036 A | 3/1997 | Berend et al. | |
| 5,861,889 A | 1/1999 | Wallace et al. | |
| 5,894,310 A | 4/1999 | Arsenault et al. | |
| 6,154,221 A | 11/2000 | Gangnet | |
| 6,268,871 B1 | 7/2001 | Rice et al. | |
| 6,441,823 B1 | 8/2002 | Ananya | |
| 6,448,964 B1 | 9/2002 | Isaacs et al. | |
| 6,781,597 B1 | 8/2004 | Vrobel et al. | |

(Continued)

FOREIGN PATENT DOCUMENTS

EP 2530623 A1 * 12/2012 ............... G06T 7/75

OTHER PUBLICATIONS

Au, Oscar Kin-Chung, et al., "Skeleton Extraction by Mesh Contraction", ACM Transactions on Graphics, vol. 27, No. 3, Article 44, Aug. 2008.*

(Continued)

*Primary Examiner* — William A Beutel
(74) *Attorney, Agent, or Firm* — SBMC

(57) ABSTRACT

Automatic bone handle generation for efficient manipulation of a graphic object is described. Initially, a request is received to generate bone handles for a graphic object. Responsive to the request, a bone handle generation system determines an outline of the graphic object. Based on the outline, this system then generates a mesh corresponding to the graphic object. The bone handle generation system contracts this mesh inward to form a contracted mesh. By then collapsing edges of the contracted mesh, the bone handle generation system generates a set of connected line segments forming a skeleton of the graphic object. The bone handle generation system reduces the set of connected line segments by removing line segments and by merging vertices that connect different line segments. Based on this reduction, the bone handle generation system obtains the bone handles, which are controllable with user input to deform corresponding portions of the graphic object.

20 Claims, 10 Drawing Sheets

(56) References Cited

U.S. PATENT DOCUMENTS

| | | | |
|---|---|---|---|
| 6,919,888 | B1 | 7/2005 | Perani et al. |
| 7,196,707 | B2 | 3/2007 | Davignon |
| 7,218,326 | B1 | 5/2007 | Bogues et al. |
| 7,302,650 | B1 | 11/2007 | Allyn et al. |
| 7,496,416 | B2 | 2/2009 | Ferguson et al. |
| 7,868,887 | B1 | 1/2011 | Yhann |
| 7,884,834 | B2 | 2/2011 | Mouilleseaux et al. |
| 8,004,539 | B2 | 8/2011 | McDaniel et al. |
| 8,373,704 | B1 * | 2/2013 | Mueller .................. G06T 13/40 345/419 |
| 8,629,871 | B2 | 1/2014 | O'Brien et al. |
| 8,830,226 | B2 | 9/2014 | Goossens |
| 8,994,736 | B2 | 3/2015 | Carr et al. |
| 9,024,938 | B2 | 5/2015 | Joshi |
| 9,454,797 | B2 | 9/2016 | Popovic et al. |
| 10,388,045 | B2 | 8/2019 | Batra et al. |
| 10,410,317 | B1 | 9/2019 | Phogat et al. |
| 10,510,186 | B2 | 12/2019 | Batra et al. |
| 2003/0033050 | A1 | 2/2003 | Yutkowitz |
| 2005/0237325 | A1 | 10/2005 | Motter et al. |
| 2007/0038421 | A1 | 2/2007 | Hu et al. |
| 2009/0213143 | A1 * | 8/2009 | Igarashi ................ G06T 3/0093 345/643 |
| 2010/0189362 | A1 * | 7/2010 | Jakubiak ............... G06F 40/129 382/203 |
| 2010/0214312 | A1 | 8/2010 | Weber et al. |
| 2012/0154397 | A1 | 6/2012 | Chernikov et al. |
| 2013/0120457 | A1 | 5/2013 | Popovic et al. |
| 2013/0300736 | A1 | 11/2013 | Schmidt |
| 2014/0104266 | A1 | 4/2014 | Stone et al. |
| 2014/0168270 | A1 | 6/2014 | Choy et al. |
| 2015/0022517 | A1 * | 1/2015 | Jutan ...................... G06T 13/40 345/419 |
| 2015/0287210 | A1 | 10/2015 | Song et al. |
| 2018/0040169 | A1 * | 2/2018 | Nakagawa ................ G06T 7/11 |
| 2018/0061092 | A1 | 3/2018 | Sasikumar et al. |
| 2018/0061093 | A1 | 3/2018 | Ning |
| 2019/0197771 | A1 | 6/2019 | Batra et al. |
| 2019/0206100 | A1 | 7/2019 | Batra et al. |
| 2019/0279406 | A1 | 9/2019 | Batra et al. |
| 2019/0295217 | A1 | 9/2019 | Phogat et al. |
| 2019/0318523 | A1 * | 10/2019 | Higginbottom ......... G06T 13/40 |
| 2020/0066038 | A1 | 2/2020 | Batra et al. |

OTHER PUBLICATIONS

Cohen-Steiner, et al., "Conforming Delaunay triangulations in 3D", Computational Geometry 28, pp. 217-233 (Year: 2004).*

"First Action Interview Office Action", U.S. Appl. No. 15/936,299, dated Jan. 18, 2019, 4 pages.

"Pre-Interview First Office Action", U.S. Appl. No. 15/861,908, dated Jan. 18, 2019, 22 pages.

Igarashi,"As-Rigid-As-Possible Shape Manipulation", ACM Transactions on Graphics 2005, Aug. 2005, 1134-1141.

Komerska,"Haptic Gdraw: A fun and Easy to Use 3D Haptically Enhanced Sculpting Program", EuroHaptics 2004, Jun. 2004, 6 pages.

Schaefer,"Image Deformation Using Moving Least Squares", SIGGRAPH, 25(3), Aug. 2006, 8 pages.

Weng,"Sketching MLS Image Deformations on the GPU", Pacific Graphics 2008, vol. 27, Oct. 2008, 1789-1796.

"Adobe Illustrator CC Tutorials", Retrieved at: https://helpx.adobe.com/in/illustrator/how-to/dynamic-symbols.html—on Jan. 8, 2019, 8 pages.

"Barycentric coordinate system—Wikipedia", https://en.wikipedia.org/wiki/Barycentric_coordinate_system—Retrieved on Oct. 11, 2017, 9 pages.

"Bounding volume hierarchy—Wikipedia", https://en.wikipedia.org/wiki/Bounding_volume_hierarchy—Retrieved on Oct. 11, 2017, 3 pages.

"First Action Interview Office Action", U.S. Appl. No. 15/852,924, dated Oct. 11, 2018, 5 pages.

"Kabsch algorithm—Wikipedia", Retrieved at: https://en.wikipedia.org/wiki/Kabsch_algorithm—Sep. 27, 2017, 4 pages.

"Pre-Interview First Office Action", U.S. Appl. No. 15/852,924, dated Jul. 27, 2018, 4 pages.

"Pre-Interview First Office Action", U.S. Appl. No. 15/936,299, datd Sep. 21, 2018, 4 pages.

"Ramer-Douglas-Peucker algorithm—Wikipedia", https://en.wikipedia.org/wiki/Ramer%E2%80%93Douglas%E2%80%93Peucker_algorithm—Retrieved on Oct. 11, 2017, 4 pages.

Au,"Skeleton Extraction by Mesh Contraction", ACM Trans. Graph., 27(3):44:1{44: 10,, Aug. 2008, 10 pages.

Batra,"Digital Media Environment for Intuitive Modifications of Digital Graphics", U.S. Appl. No. 15/852,924, filed Dec. 22, 2017, 60 pages.

Batra,"Generating a Triangle Mesh for an Image Represented by Curves", U.S. Appl. No. 15/861,908, filed Jan. 4, 2018, 80 pages.

Boye,"A Vectorial Solver for Free-form Vector Gradient", ACM Trans. Graph. 31, 6, Article 173, Sep. 17, 2012, 10 pages.

De"Vector Field Processing on Triangle Meshes", In SIGGRAPH Asia 2015 Courses (SA '15), Nov. 2, 2015, 49 pages.

Jacobson,"Bounded Biharmonic Weights for Real-Time Deformation", In ACM SIGGRAPH 2011 Papers, SIGGRAPH '11, Jul. 2011, 8 pages.

Jacobson,"Fast Automatic Skinning Transformations", ACM Trans. Graph. 31, Jul. 2012, 10 pages.

Liu,"Skinning Cubic B'ezier Splines and Catmull-Clark Subdivision Surfaces", ACM Trans. Graph., 33(6):190:1{190:9, Nov. 19, 2014, 9 pages.

Phogat,"Digital Image Transformation Environment using Spline Handles", U.S. Appl. No. 15/936,299, filed Mar. 26, 2018, 42 pages.

Schneider,"An Algorithm for Automatically Fitting Digitized Curves", Academic Press Professional, Inc., San Diego, CA, USA, 1990., Aug. 1, 1990, pp. 612-626.

Shewchuk,"Triangle: Engineering a 2D Quality Mesh Generator and Delaunay Triangulator", Applied Computational Geometry: Towards Geometric Engineering, Lin M. C., Manocha D., (Eds.), val. 1148 of Lecture Notes in Computer Science. Springer-Verlag, May 1996, pp. 203-222. From the First ACM Workshop on Applied Computational Geometry., May 1996, 10 pages.

Visvalingam, "The Douglas-Peuker Algorithm for Line Simplification: Re-evaluation through Visualization", Sep. 1990, pp. 213-228.

"Notice of Allowance", U.S. Appl. No. 15/852,924, dated Aug. 2, 2019, 8 pages.

"Combined Search and Examination Report", GB Application No. 1816796.5, dated Apr. 17, 2019, 5 pages.

"Final Office Action", U.S. Appl. No. 15/852,924, dated Apr. 30, 2019, 17 pages.

"Notice of Allowance", U.S. Appl. No. 15/861,908, dated Apr. 3, 2019, 14 pages.

"Notice of Allowance", U.S. Appl. No. 15/936,299, dated May 3, 2019, 9 pages.

Martins,"Bezier Curve Quick Tips: Two Methods for Smooth Curves", Posted Sep. 16, 2014; https://learn.scannerlicker.net/2014/09/16/bezier-curve-quick-tips-two-methods-for-smooth-curves/, Sep. 16, 2014, 11 pages.

"First Action Interview Office Action", U.S. Appl. No. 16/674,931, dated Apr. 10, 2020, 3 pages.

"Pre-Interview First Office Action", U.S. Appl. No. 16/427,005, dated May 20, 2020, 23 pages.

"Pre-Interview First Office Action", U.S. Appl. No. 16/674,931, dated Feb. 20, 2020, 3 pages.

Huynh,"Bijective Deformations in Rn via Integral Curve Coordinates", May 1, 2015, 11 pages.

Kami,"Spectral Compression of Mesh Geometry", Jul. 2000, 8 pages.

Meng,"Interactive Image Deformation Using Cage Coordinates on GPU", Jan. 2009, pp. 119-126.

Sorkine,"Laplacian Surface Editing", Jul. 2004, 10 pages.

, "Final Office Action", U.S. Appl. No. 16/674,931, dated Sep. 1, 2020, 13 pages.

, "First Action Interview Office Action", U.S. Appl. No. 16/427,005, dated Jul. 13, 2020, 3 pages.

(56) References Cited

OTHER PUBLICATIONS

, "First Action Interview Office Action", U.S. Appl. No. 16/387,186, dated Sep. 11, 2020, 3 pages.
, "Notice of Allowance", U.S. Appl. No. 16/427,005, dated Jul. 31, 2020, 12 pages.
, "Pre-Interview First Office Action", U.S. Appl. No. 16/387,186, dated Jul. 13, 2020, 8 pages.

* cited by examiner

BONE HANDLE GENERATION

BACKGROUND

Content creation systems include a variety of tools that enable creation of vast amounts of digital visual content, such as vector graphics. Users are able to interact with these content creation systems in various ways (e.g., touch functionality, styluses, keyboard and mouse, and so on) to modify the digital visual content. By way of example, many such systems support a variety of operations to modify graphic objects that are part of the digital visual content. These operations include, for instance, scaling graphic objects, changing an orientation of graphic objects (e.g., rotating), creating new graphic objects, removing portions of graphic objects, and so forth. Content creation systems also support operations to modify characteristics of graphic objects, such as operations to modify colors, transparency, and path shapes. Broadly speaking, the ability to modify path shapes enables content creation systems to deform portions of a graphic object, e.g., to change a position, size, or orientation of just portions of a graphic object. Consider an example in which a graphic object is a person. By modifying path shapes of the graphic object, an arm of the person may be deformed from a straight position to a bent, flexing position.

Conventionally configured content creation systems include limited tools for graphic object deformation. By way of example, conventionally configured content creation systems enable users to provide input to define point handles for graphic objects. These point handles are each linked to a corresponding portion of the graphic object and can be manipulated based on user input to the system, causing the system to deform the corresponding portion of the graphic object. As user input is received to manipulate the point handles, however, these conventional systems deform the corresponding graphic object without preserving local coherence of portions of the graphic object affected by the deformation. As such, the deformations appear unnatural—they may cause curves in the graphic object that would not occur assuming the graphic object were tied to an at least semi-rigid underlying structure, e.g., bones.

To address the failure of point handles to preserve local coherence, advances in content creation systems allow users to provide input to define bone handles for graphic objects. Broadly speaking, bone handles are a series of lines connected by vertices that can serve as a "skeleton" of a graphic object. Like point handles, bone handles may be manipulated through user input to deform a corresponding portion of a graphic object. Unlike point handles, however, systems that leverage bone handles deform portions of the graphic object rigidly, preserving local coherence of the portions of the graphic object affected by deformation. This is due to portions of the graphic object being linked not only to the vertices of the bone handles but also to the line segments between the vertices. Nevertheless, reliance of conventional systems on users to define bone handles (e.g., positions in relation to a graphic object, numbers of bone handles, lengths of the line segments, and so forth) results in unsuitable placement of bone handles, which causes the graphic object to be deformed such that it does not appear to be supported by a realistic underlying structure. Moreover, the reliance of these systems on user interaction to define the bone handles can cause users that do not know how to define bone handles not to deform graphic objects. Accordingly, conventional content creation systems are limited in the manners in which they support graphic-object deformation.

SUMMARY

To overcome these problems, automatic bone handle generation is leveraged in a digital medium environment. Initially, a request is received to generate bone handles for a graphic object, such as a vector graphic. This request, for instance, may correspond to a user selection of an option to generate the bone handles or to hovering proximate the graphic object. Regardless, a bone handle generation system determines an outline of the graphic object, e.g., by sampling portions of the graphic object. Based on the outline, this system then generates a mesh corresponding to the graphic object. In one or more implementations, the bone handle generation system generates a triangle mesh within the outline using a triangulation technique. The bone handle generation system contracts this mesh inward to form a contracted mesh. By then collapsing edges of the contracted mesh, the bone handle generation system generates a set of connected line segments forming a skeleton of the graphic object. The bone handle generation system reduces the set of connected line segments by removing line segments and by merging vertices that connect different line segments. Based on this reduction, the bone handle generation system obtains the bone handles, which are controllable with user input to deform corresponding portions of the graphic object.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
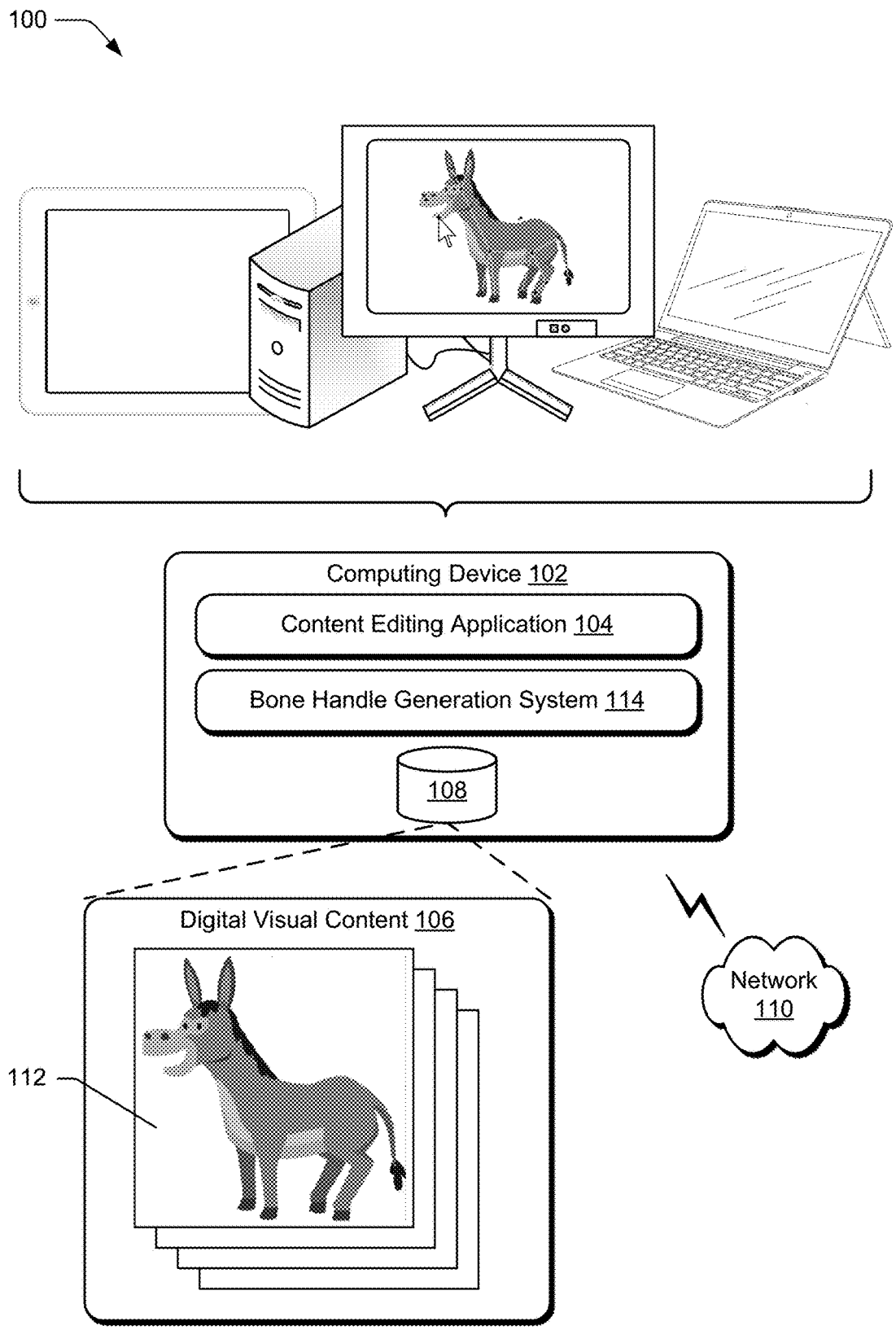
FIG. 1 is an illustration of an environment in an example implementation that is operable to employ techniques described herein.

Conventionally configured content creation systems include limited tools for graphic object deformation. By way of example, conventionally configured content creation systems enable users to provide input to define point handles for graphic objects. However, these conventional systems deform graphic objects based on point-handle input without preserving local coherence of portions of the graphic objects affected by the deformation. As such, deformations made to graphic objects using point handles can appear unnatural—they may cause curves in the graphic object that would not occur assuming the graphic object were tied to an at least semi-rigid underlying structure, e.g., bones.

To address the failure of point handles to preserve local coherence, advances in content creation systems allow users to provide input to define bone handles for graphic objects. Conventional systems that support bone handles rely on human input to define the bone handles for a graphic object though. For instance, these conventional systems rely on human input to define positions of the bone handles in relation to the graphic object, a number of bone handles, lengths of line segments, and so forth. This reliance of conventional systems on users to define the bone handles results in unsuitable placement of bone handles for enabling deformation of the graphic object so that it appears to be supported by a realistic underlying structure. Moreover, the reliance of these systems on user interaction to define the bone handles can cause users that do not know how to define bone handles not to deform graphic objects. Accordingly, conventional content creation systems are limited in the manners in which they support graphic-object deformation.

To overcome these problems, automatic bone handle generation is leveraged in a digital medium environment. Initially, a bone handle generation system receives a request to generate bone handles for a graphic object, such as a vector graphic. The bone handle generation system may receive this request based on a variety of actions, such as based on a user selection of an option presented by a content editing application to generate bone handles, by detecting a cursor hovering proximate the graphic object, by detecting a user's finger positioned above a portion of a touch screen displaying the graphic object, and so forth.

Regardless of the action to initiate the request, the bone handle generation system generates bone handles for the graphic object without user input to define the bone handles, e.g., without user input to define the positions of the bone handles in relation to the graphic object, the number of bone handles, or the lengths of the line segments. Rather than rely on user input to define bone handles for the graphic object, the bone handle generation system determines the graphic object's outline. To determine the outline, the bone handle generation system may sample portions of the graphic object to identify whether the portions correspond to the outline or to an interior of the graphic object.

Given the outline of the graphic object, the bone handle generation system generates a mesh corresponding to the graphic object. By way of example, the bone handle generation system generates a triangle mesh of the graphic object using a triangulation technique, such as the Conforming Delaunay Triangulation procedure. In one or more implementations, the bone handle generation system ignores any holes within the graphic object. Thus, rather than generating the mesh around holes of the graphic object, the bone handle generation system generates the mesh to cover the holes, as if there are no holes in the graphic object.

Once the mesh is generated, the bone handle generation system contracts the generated mesh. The bone handle generation system "pulls" edges of the mesh inward to form a contracted mesh. An example of this contraction is represented pictorially in FIG. 3. To form the contracted mesh, the bone handle generation system determines a contraction operator (e.g., a Laplace-Beltrami operator) of a surface of the mesh. This contraction operator is indicative of a magnitude and a direction of contraction to apply to the vertices of the mesh. The bone handle generation system contracts the mesh by "pulling" in the vertices of the mesh according to the determined operator.

The bone handle generation system then processes the contracted mesh to generate a set of connected line segments forming a skeleton of the graphic object. In particular, the bone handle generation system collapses the contracted mesh to obtain the set of connected line segments. In one or more implementations, the bone handle generation system collapses the contracted mesh iteratively by determining a cost of merging vertices of the contracted mesh, identifying a pair of vertices having a lowest cost, and merging the identified pair of vertices. The bone handle generation system performs this iterative collapsing until there are no more closed shapes (e.g., triangles of the mesh)—in other words, until only the connected line segments remain.

The bone handle generation system then reduces the connected line segments that remain after the collapsing to obtain the bone handles. As part of reducing the connected line segments, the bone handle generation system removes line segments that are relatively small in length. Additionally, the bone handle generation system merges vertices that are relatively close to one another into a single vertex, such as vertices having a high degree. In one or more implementations, the bone handle generation system reduces the connected line segments to the bone handles by identifying paths of the connected segments and by processing these identified paths using the Douglas-Peucker algorithm.

The bone handle generation system configures the line segments that remain after the reduction as bone handles. As part of this, the bone handle generation system displays representations of the bone handles and enables user input to be received in relation to the bone handles to manipulate them. By automatically generating bone handles for a graphic object in this way, the bone handle generation system eliminates reliance on human users to define the bone handles. Moreover, the bone handle generation system provides the advantage of defining bone handles for the graphic object to have suitable placement, e.g., to enable deformation of the graphic object so that it appears to be supported by a realistic underlying structure. This automatic generation by the bone handle generation system thus enables more efficient deformation of graphic objects in a way that preserves local coherence of portions of the graphic objects affected by the deformation. Deformation of graphic objects that leverages bone handles generated by the described bone handle generation system is more efficient because this system limits user input to mere manipulation inputs received in relation to the automatically generated bone handles—without requiring user inputs to actually define the bone handles. As used herein, a "manipulation input" received in relation to an automatically generated bone handle changes a position of at least a portion of the bone handle and is effective to deform a corresponding portion of a graphic object.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 10.

The computing device 102 is illustrated as including content editing application 104. The content editing application 104 represents functionality of the computing device 102 to create and/or edit digital content. By way of example, the content editing application 104 includes functionality to edit digital visual content, such digital graphics and digital images that include graphics. Examples of digital graphics include, but are not limited to, vector graphics, raster graphics, layouts having different types of graphics, and so forth Further, the content editing application 104 may enable a client device user to interact with application interfaces presented via the computing device 102 to perform content editing operations, such as selecting portions of digital content, adding new vector graphics and portions of vector graphics (e.g., lines, shapes, text, and so on), removing vector graphics and portions of vector graphics, modifying characteristics of vector graphics (e.g., color, transparency, groupings, z-order, and so on), and so forth. The content editing application 104 may facilitate other content editing operations without departing from the spirit or scope of the techniques described herein. The content editing application 104 may further be representative of more than one application that supports functionality to perform content editing operations on various types of digital content without departing from the spirit or scope of the techniques described herein.

At least some of the digital content, relative to which the content editing application 104 is configured to perform operations, is represented by digital visual content 106, which is illustrated as maintained in storage 108 of the computing device 102. Although the digital visual content 106 is illustrated as being maintained in the storage 108, the digital visual content 106 may also represent digital content accessible to the computing device 102 in other ways, e.g., accessible to the computing device 102 from storage of another device over network 110. In such implementations, the computing device 102 may represent functionality to perform the bone handle generation described above and below for other devices, e.g., to offload some of the computing burden of doing so from those devices. In other words, the computing device 102 may be configured to provide bone handle generation as a service—and thus be considered associated with a service provider.

The digital visual content 106 may represent various types of digital content without departing from the spirit or scope of the techniques described herein. The digital visual content 106 is depicted with graphic object 112, for instance, which represents a digital visual content item having at least one vector graphic. As mentioned above, other types of graphics may be considered within the spirit or scope of the described techniques. Regardless, in scenarios where the graphic object 112 comprises a vector graphic, the graphic object 112 may be modified in various ways that vector graphics are capable of being modified.

In the illustrated environment 100, the computing device 102 is depicted including the bone handle generation system 114, the functionality of which may be incorporated in and/or accessible to the content editing application 104. The bone handle generation system 114 is implemented at least partially in hardware of the computing device 102 to generate bone handles for the graphic object 112. In particular, the bone handle generation system 114 generates bone handles "automatically," e.g., without receiving user input for defining a bone handle or characteristics of a bone handle. Instead, user input may be received simply to select an option to generate bone handles for the graphic object 112, such as by providing input to select the graphic object 112 via a user interface, navigating to a menu option for generating bone handles, and then selecting the option. A user of the computing device 102 may perform a selection to generate bone handles in other ways without departing from the spirit or scope of the described techniques, such as by using keyboard shortcuts, stylus gestures, voice commands, and so forth. Although illustrated as implemented locally at the computing device 102, functionality of the illustrated bone handle generation system 114 may also be implemented in whole or part via functionality available via the network 110, such as part of a web service or "in the cloud."

As discussed in more detail below, the bone handle generation system 114 generates bone handles for graphic objects, such as vector graphics, by determining an outline of a graphic object, generating a triangular mesh within the determined outline, contracting the triangular mesh based on characteristics of triangles in the mesh, collapsing edges of the contracted mesh's triangles to produce connected line segments, and reducing a number of line segments to a set of connected line segments comprising the bone handles. Although triangle meshes are discussed in relation to the described techniques, it is to be appreciated that the bone handle generation system 114 may generate and contract other types of meshes without departing from the spirit or scope of the techniques described herein, such as quadrilateral-based meshes and other polygon base meshes.

In any case, the bone handles allow a user to provide input, via a user interface and in relation to a given bone handle, to manipulate the respective graphic object. In particular, the bone handles allow a user to manipulate the graphic object by deforming its shape. In contrast to point handles, however, which allow users to provide input that is substantially freeform and thus can deform a shape of a graphic object beyond recognition, the generated bone handles limit the deformations that can be made to the shape of the graphic object. Specifically, bone handles preserve local feature coherence—a structure—of the graphic object.

Having considered an example environment, consider now a discussion of some example details of the techniques for bone handle generation in a digital medium environment in accordance with one or more implementations.

Bone Handle Generation

Figure 2:
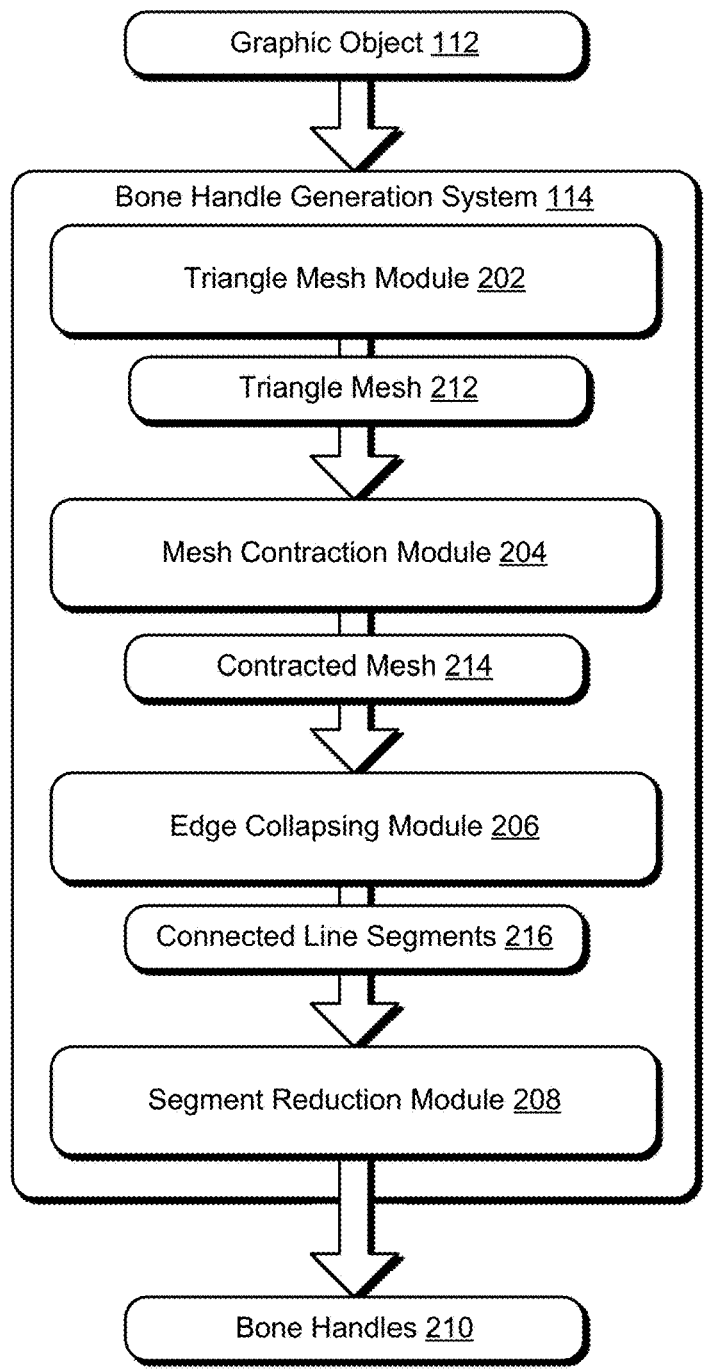
FIG. 2 depicts an example system in which the bone handle generation system of FIG. 1 generates bone handles for a graphic object.

FIG. 2 depicts an example system 200 in which a bone handle generation system of FIG. 1 generates bone handles for a graphic object. The illustrated example 200 includes from FIG. 1 the bone handle generation system 114, which is depicted receiving the graphic object 112.

In the illustrated example 200, the bone handle generation system 114 includes triangle mesh module 202, mesh contraction module 204, edge collapsing module 206, and segment reduction module 208. These modules represent functionality of the bone handle generation system 114 to generate bone handles 210 from the graphic object 112, where the bone handles 210 as generated are usable to deform portions of the graphic object 112 as described above and below. It is to be appreciated that in implementation, the bone handle generation system 114 may include more, fewer, or different modules to carry out the described functionality without departing from the spirit or scope of the techniques described herein.

The triangle mesh module 202 represents functionality of the bone handle generation system 114 to generate triangle mesh 212 of the graphic object 112. To generate the triangle mesh 212, the triangle mesh module 202 initially determines an outline of the graphic object 112. In scenarios where the graphic object 112 is a vector graphic, for instance, the triangle mesh module 202 may determine the graphic object 112's outline by processing data defining the vector graphic. Broadly speaking, vector graphics are defined in terms of two-dimensional (2D) points, which are connected by lines and curves to form shapes, including polygons. These 2D points each have a definite position on an x- and y-axis of a work plane and determine a direction of a vector path—an outline that represents a series of smooth, straight (vector) lines instead of raster or bitmap dots. Additionally, each path may have various characteristics, including values for stroke color, shape, curve, thickness, fill, and so forth. Given this, the triangle mesh module 202 may thus determine an outline for the graphic object 112, when configured as a vector graphic, by identifying a series of the graphic object 112's outermost 2D points.

The triangle mesh module 202 generates the triangle mesh 212 based on the determined outline of the graphic object 112, e.g., to fill the determined outline. In one or more implementations, the triangle mesh module 202 ignores holes of the graphic object 112 when generating the triangle mesh 212. Thus, rather than avoid generating portions of the triangle mesh 212 at locations corresponding to holes of the graphic object 112—generating the triangle mesh 212 around the holes—the triangle mesh module 202 generates the triangle mesh 212 to cover the holes, as if there are no holes. The triangle mesh module 202 may be configured to generate the triangle mesh 212 within (up to) the determined outline of the graphic object 112 or to include the determined outline (or at least some portions of the outline).

In one or more implementations, the triangle mesh module 202 generates the triangle mesh 212 as a two-dimensional (2D) mesh by sampling the outline of the graphic object 112. Once the outline is sampled, the triangle mesh module 202 then triangulates a shape indicated by the sampled outline using a triangulation technique, such as the Conforming Delaunay Triangulation procedure. Using the triangulation technique, holes in the graphic object 112 are subsumed by the triangle mesh 212. In the context of a generated triangle mesh, consider FIG. 3.

Figure 3:
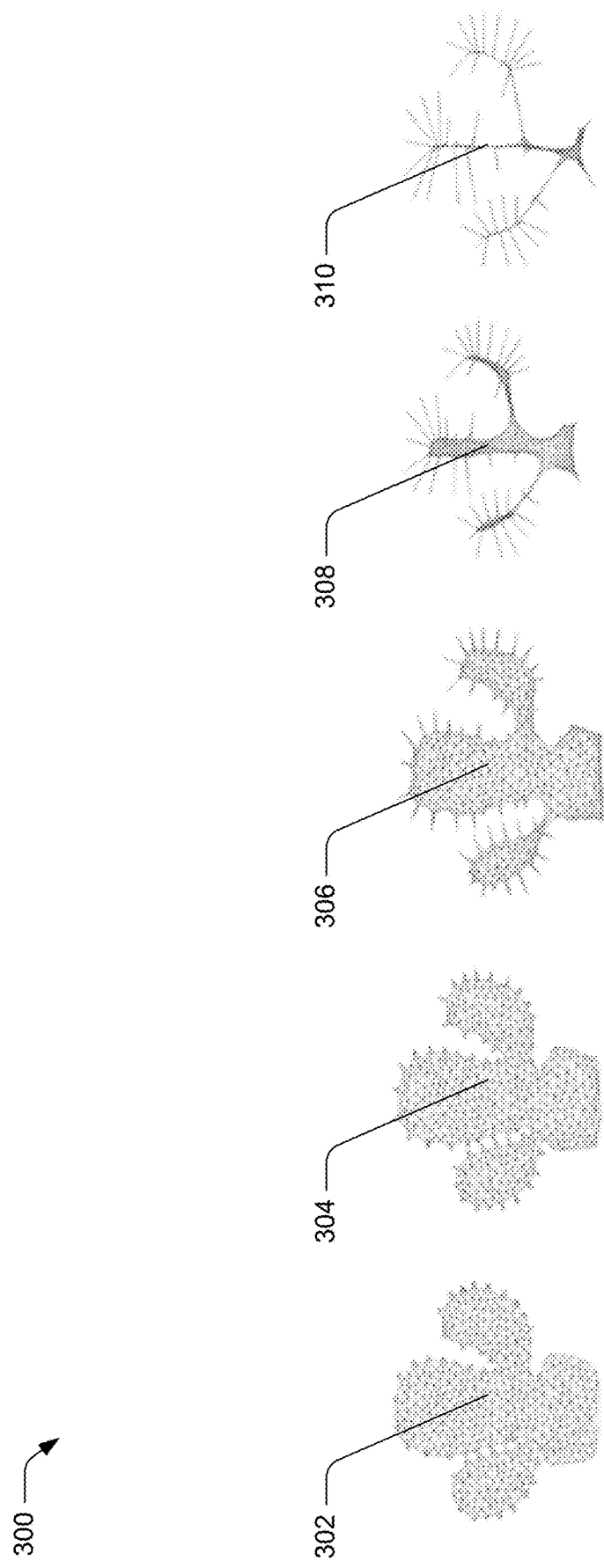
FIG. 3 depicts an example implementation in which a triangle mesh generated for a graphic object is contracted.

FIG. 3 depicts an example 300 of an implementation in which a triangle mesh generated for a graphic object is contracted.

In particular, the illustrated example 300 includes meshes 302, 304, 306, 308, 310. The mesh 302 is an example of a triangle mesh that may be generated by the triangle mesh module 202 and the other meshes 304, 306, 308, and 310 are examples of meshes that are contracted from the mesh 302, such as by the mesh contraction module 204. The mesh 302 may thus correspond to a particular example instance of the triangle mesh 212, e.g., generated for a graphic object shaped like a cactus. The other meshes 304, 306, 308, and 310 represent stages of contraction of the mesh 302. In this example 300, the mesh 310 may represent a final stage of contraction, such that this mesh is provided as input to the edge collapsing module 206. Accordingly, in this example 300 the mesh 310 may correspond to contracted mesh 214. In this context, consider now the following discussion of the mesh contraction module 204.

Generally speaking, the mesh contraction module 204 represents functionality to generate the contracted mesh 214 (e.g., the mesh 310) from the triangle mesh 212 (e.g., the mesh 302). By way of example, the mesh contraction module 204 contracts the triangle mesh using one or more mesh contraction techniques. In one or more implementations, the mesh contraction module 204 contracts the triangle mesh 212 into the contracted mesh 214 in accordance with the following discussion, although the mesh contraction module 204 may leverage different mesh contraction techniques without departing from the spirit or scope of the techniques described herein.

Initially, the mesh contraction module 204 determines a Laplace-Beltrami operator of a surface discretized by the triangle mesh 212. Once this operator is determined, the mesh contraction module 204 applies the operator to the triangle mesh 212 to further determine inward normals to the triangle mesh 212 at each of its vertex points. These inward normals have magnitudes that are proportional to the local curvature of the triangle mesh 212 and indicate a direction of contraction.

By leveraging this technique, the mesh contraction module 204 treats the 2D triangle mesh 212 as a three-dimensional mesh with a small thickness, which implies that the boundaries of the mesh have a high amount of curvature and that the interior portions of the mesh will not. Due to the differences in curvature, the mesh contraction module 204 determines stronger contraction at the boundary of the triangle mesh 212 than interior portions of the triangle mesh 212 through application of the Laplace-Beltrami operator. In one example, the mesh contraction module 204 applies the contraction operator based on solving the following equation:

$$\begin{bmatrix} W_L L \\ W_H \end{bmatrix} V' = \begin{bmatrix} 0 \\ W_H V \end{bmatrix}$$

Here, the terms V and V' represent matrices, where each row corresponds to a vertex in an input mesh (before contraction) and an output mesh (after contraction), respectively. The terms $W_L$ and $W_H$ represent diagonal matrices which weight each vertex's contribution, and L is a contingent Laplacian. In one or more implementations, the mesh contraction module 204 leverages a reduced version of the equation noted just above to contract the triangle mesh 212. By way of example, the mesh contraction module 204 leverages the following reduced equation to apply the contraction operator:

$$((W_L L)^T (W_L L) + W_H^2) V' = W_H^2 V$$

In at least some implementations, the mesh contraction module 204 uses a QR solver to solve the original equation and contracts the triangle mesh based on the solving. After the mesh contraction module 204 generates the contracted mesh 214, the edge collapsing module 206 collapses edges of the contracted mesh 214 to generate connected line segments 216.

To generate the connected line segments 216, the edge collapsing module 206 generally removes and merges edges of the triangles of the contracted mesh 214 until all faces are removed—until only connected line segments not forming closed shapes (triangles) remain. In one or more implementations, the edge collapsing module 206 removes and merges the edges of the triangles of the contracted mesh 214 according to an edge collapsing technique, such as according to a Quadratic Error Metric based technique.

Using this edge collapsing technique, the edge collapsing module 206 ranks the edges of the contracted mesh 214 based on a cost function. In one or more implementations, the cost function includes components that are based an edge (u, v) of the contracted mesh 214, where u and v represent any given two, directly-connected vertices of the mesh. The two components of the cost function are a distance component that penalizes greater distances from v to any edges incident to u, and a merge-change component that penalizes greater changes in edge lengths if a proposed merge operation is to be carried out. The edge collapsing module 206 iteratively identifies the edge (u, v) with the lowest cost and merges u into v. Once the edge collapsing module 206 identifies the edge with the lowest cost and merges it in association with an iteration, the edge collapsing module 206 then updates the cost of the merged edge's neighboring edges. The edge collapsing module 206 carries out this edge collapsing technique iteratively until the triangle mesh is eliminated and only the connected line segments 216 remain. In the context of connected line segments generated by the edge collapsing module 206 from a contracted mesh, consider FIG. 4.

Figure 4:
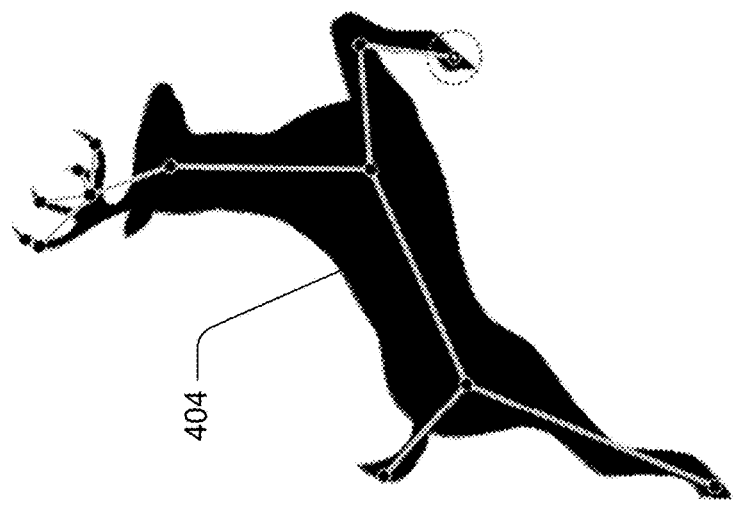
FIG. 4 depicts an example implementation in which line segments, determined by collapsing a contracted triangle mesh, are reduced to generate bone handles for a graphic object.
Figure 4:
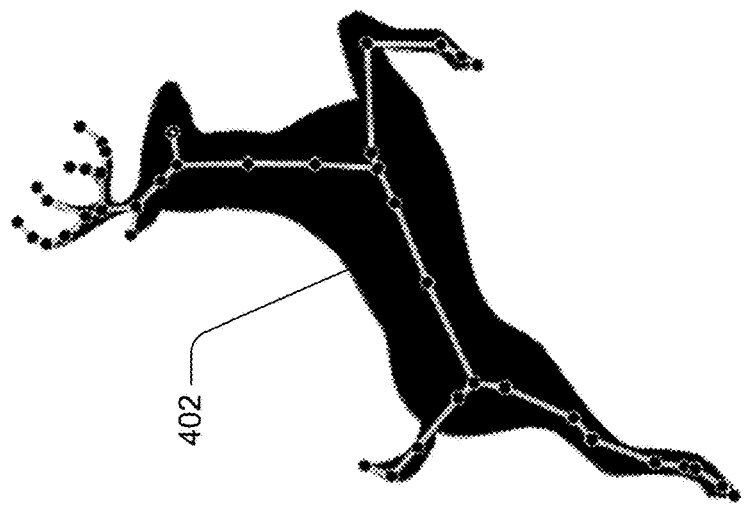

FIG. 4 depicts an example 400 of an implementation in which line segments, determined by collapsing a contracted triangle mesh, are reduced to generate bone handles for a graphic object.

In particular, the illustrated example 400 includes a pre-simplification stage 402 and a post-simplification stage 404. Both the pre-simplification stage 402 and the post-simplification stage 404 include a deer graphic having lines and vertices. However, the pre-simplification stage 402 includes more lines and more vertices corresponding to a "skeleton" of the deer than the post-simplification stage 404. The lines and vertices of the pre-simplification stage 402 are one example of the connected line segments 216 generated by the edge collapsing module 206 from a corresponding contracted mesh 214.

In contrast, the lines and vertices of the post-simplification stage 404 are an example of the bone handles 210 generated by the segment reduction module 208 given the lines and vertices of the pre-simplification stage 402 as input, e.g., as the connected line segments 216. By way of example, the segment reduction module 208 generates the bone handles 210 using one or more handle simplification techniques. Although the segment reduction module 208 may generate the bone handles 210 from the connected line segments 216 according to the following discussion, it should be appreciated that the segment reduction module 208 may generate the bone handles 210 from the connected line segments 216 using other techniques without departing from the spirit or scope of the described system.

Broadly speaking, the connected line segments 216 generated by the edge collapsing module 206 are a graph comprising a tree. Initially, the segment reduction module 208 determines a vertex of the connected line segments 216 which has the highest degree, and designates this vertex as a "root" of the tree. The segment reduction module 208 then removes vertices from the connected line segments 216, such as by applying the Douglas-Peucker algorithms on paths (e.g., groups of connected line segments) between two high-degree vertices and based on the determined root vertex. By applying this algorithm, the segment reduction module 208 removes segments that are relatively small in length, e.g., small leaves of the tree.

The segment reduction module 208 also merges high-degree vertices that are positioned relatively close to one another into a single vertex. As an example of this reduction consider again FIG. 4, where the post-simplification stage 404 represents the lines and vertices that remain after processing by the segment reduction module 208. These remaining line segments and vertices correspond to the bone handles 210. The bone handle generation system 114 then configures the reduced set of line segments and vertices to enable user interaction in relation to them, e.g., to deform the graphic object 112 by moving the bone handles 210.

Notably, these bone handles 210 are automatically generated by the bone handle generation system 114 without user input to define the bone handles. Given the bone handles 210 automatically produced by the system, the system is also configured to receive handle-defining user input to further modify the automatically generated bone handles 210, such as by adding one or more bone handles (e.g., additional vertices or line segments) to the generated set of bone handles or removing one or more bone handles (e.g., existing vertices or line segments). In the context of moving bone handles to cause a deformation of a graphic object consider now FIGS. 5 and 6.

Figure 5:
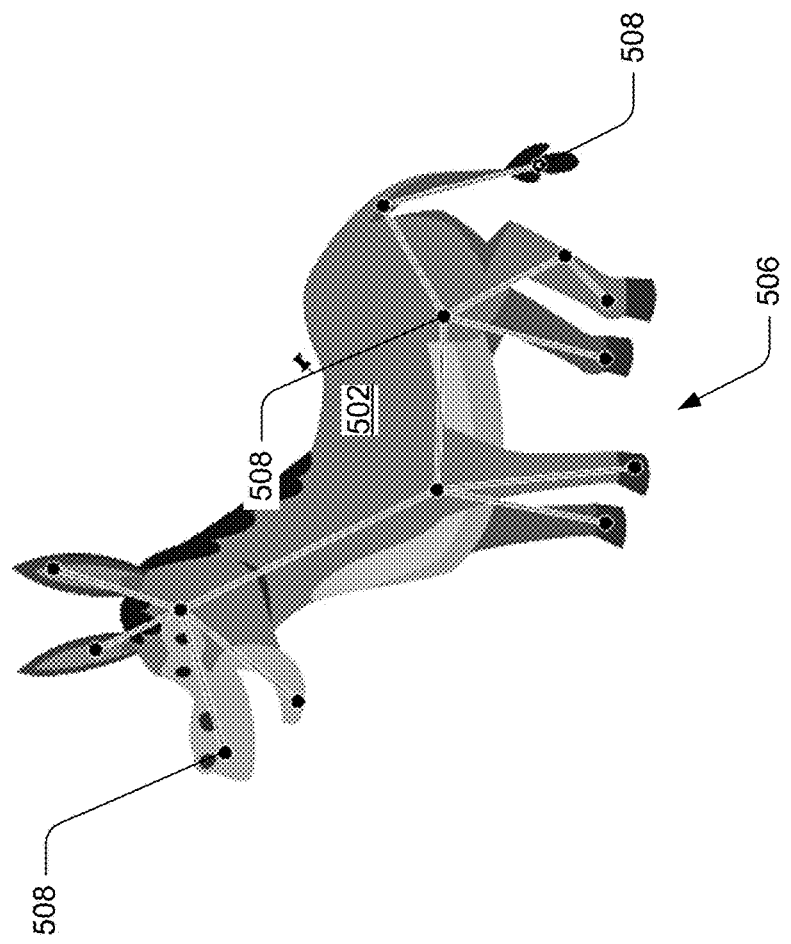
FIG. 5 depicts an example implementation of bone handles generated for a graphic object.
Figure 5:
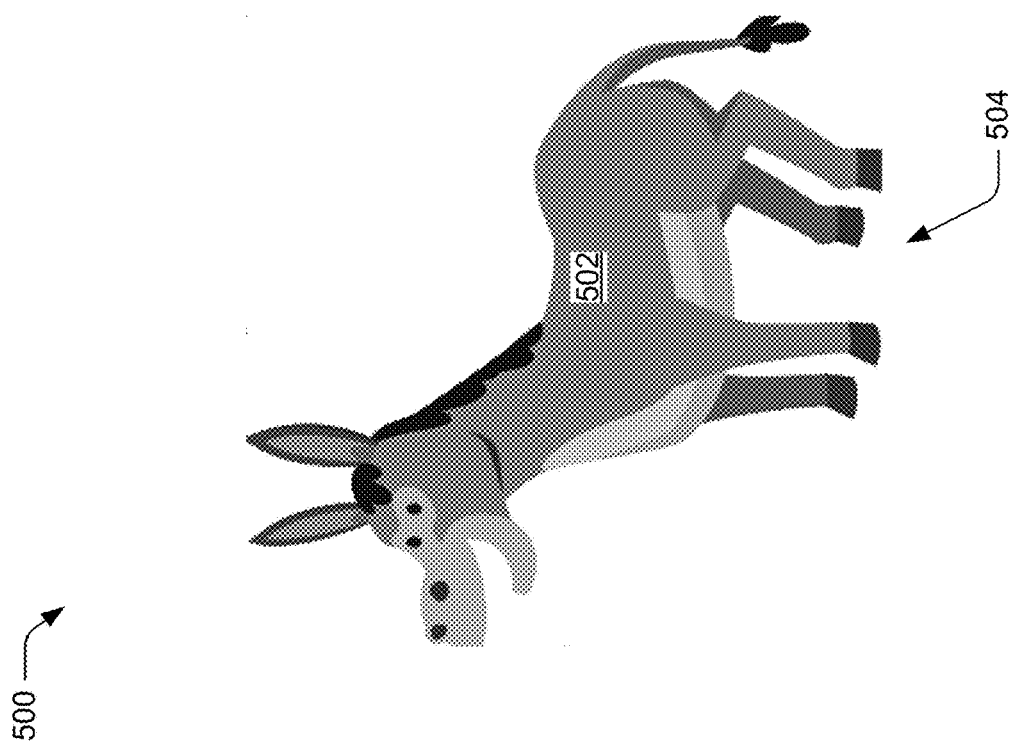

FIG. 5 depicts an example 500 of an implementation of bone handles generated for a graphic object.

The illustrated example 500 includes an example graphic object, vector graphic 502. In the illustrated example 500, the vector graphic 502 is depicted at stages 504, 506. By way of comparison, the vector graphic 502 at the stage 506 is depicted with bone handles 508 and the vector graphic 502 at the stage 504 is depicted without the bone handles 508. The vector graphic 502 may be displayed via a user interface with the bone handles 508 as at the stage 506 responsive to a user selection, such as a user selection of a menu option to generate the bone handles 508 for the vector graphic 502 or a menu option to show already-generated bone handles. Additionally or alternately, the vector graphic 502 may be displayed with the bone handles 508 responsive to "hovering" over the vector graphic 502, e.g., with a cursor or with a finger or stylus above the vector graphic 502. In such hovering scenarios, the bone handles 508 may be generated responsive to hovering over the vector graphic 502.

In scenarios such as those mentioned just above, the vector graphic 502 as depicted at the stage 506 represents a display at a time that is after an earlier time at which the vector graphic 502 is displayed as depicted at the stage 504. In different scenarios, though, the vector graphic 502 as depicted at the stage 504 may represent a display at a time that is after an earlier time at which the vector graphic 502 is displayed as depicted at the stage 506, such as responsive to a user selection to hide the bone handles 508 or responsive to no longer hovering over the vector graphic 502. In any case, the bone handles 508 can be manipulated responsive to user input change their position and orientation. Responsive to such input, the system deforms the vector graphic 502. In accordance with receiving manipulation inputs in relation to the bone handles 508 to deform the vector graphic 502, consider FIG. 6.

Figure 6:
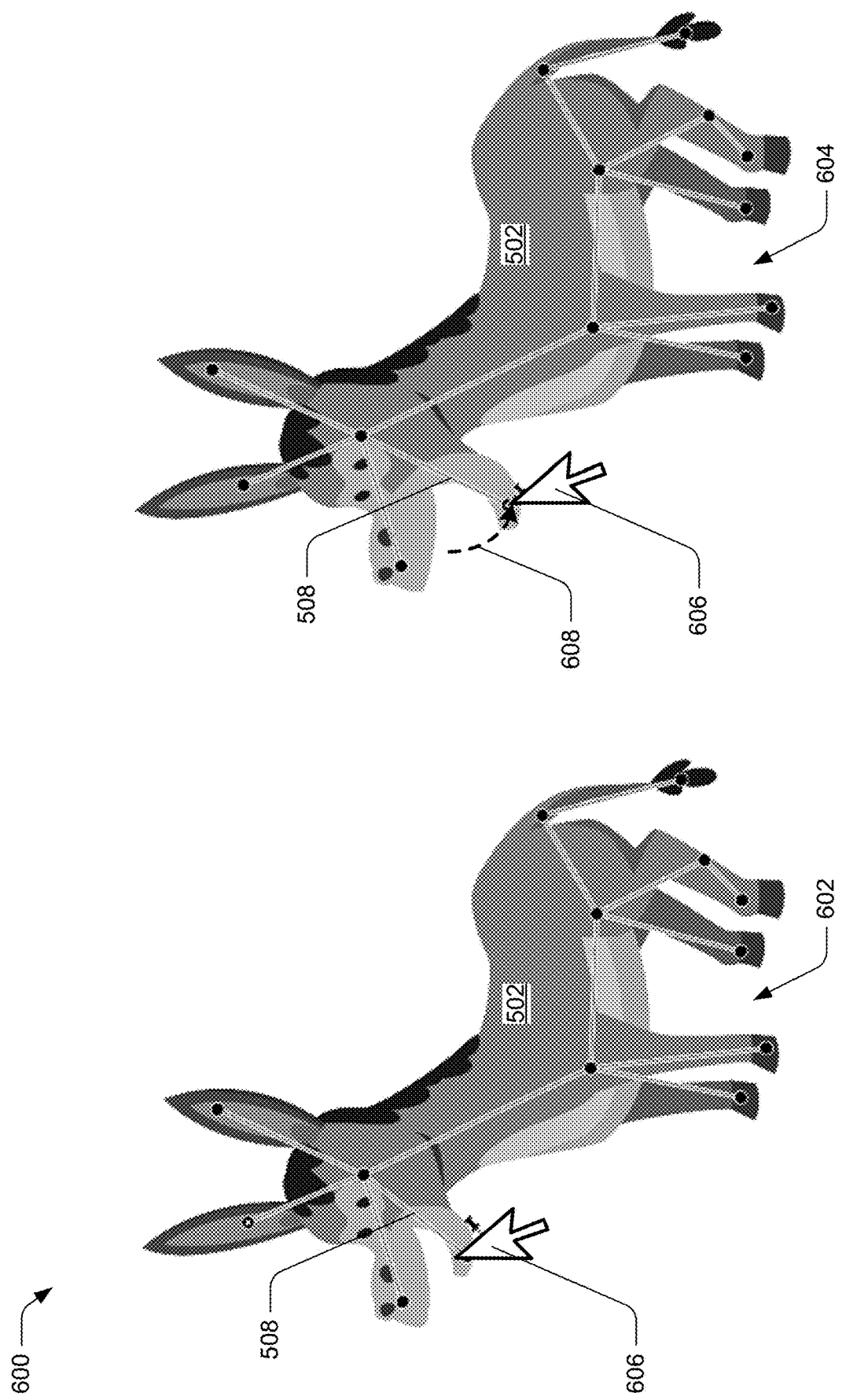
FIG. 6 depicts an example implementation of receiving user input in relation to a bone handle to rigidly deform a portion of a graphic object and substantially preserve local feature coherence of the deformed portion of the graphic object.

FIG. 6 depicts an example 600 of an implementation of receiving user input in relation to a bone handle to rigidly deform a portion of a respective graphic object and substantially preserve local feature coherence of the deformed portion of the graphic object.

The illustrated example 600 depicts the vector graphic 502 of FIG. 5 at two different stages, stages 602, 604. The illustrated example 600 also includes cursor 606. With respect to the stage 602, the cursor 606 is depicted over one of the bone handles 508. This represents a selection of the indicated bone handle for manipulation. In other words, the bone handle 508—over which the cursor 606 is positioned—is selected, e.g., based on a user selection input. Further, this bone handle is controllable responsive to receiving user manipulation inputs to change its position and orientation. Based on this change, a corresponding portion of the vector graphic 502 is deformed.

At the stage 604, the cursor 606 is shown having been dragged 608 downward in relation to its position at the stage 602. This represents that a user manipulation input is received in relation to the bone handle 508 selected at the stage 602. The user manipulation input is effective to manipulate the bone handle 508. Based on manipulation of the bone handle, a corresponding portion of the vector graphic 502 is rigidly deformed. By manipulating bone handles, a shape of the vector graphic 502 is substantially maintained so that the vector graphic 502—although deformed—preserves local feature coherence. In contrast to bone handles, point handles do not preserve local feature coherence. Instead, point handles allow shapes to be deformed in a non-rigid manner that fails to preserve local feature coherence.

Figure 7:
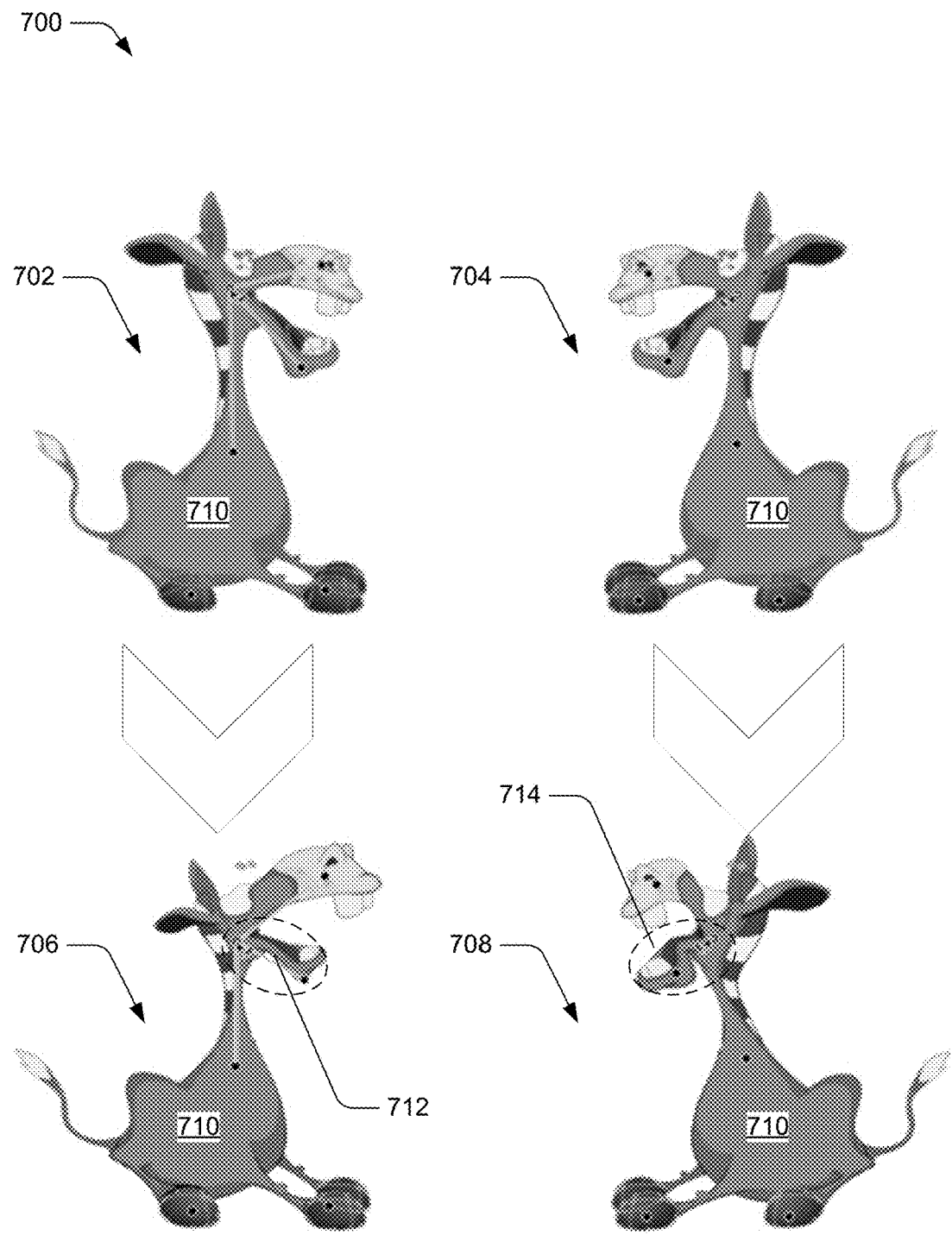
FIG. 7 depicts examples of deformations to graphic objects that result from inputs relative to bone handles and inputs relative to point handles.

FIG. 7 depicts examples 700 of deformations to graphic objects that result from inputs relative to bone handles and inputs relative to point handles.

The illustrated example 700 includes displays 702, 704, 706, 708, which each have vector graphic 710. The display 702 depicts bone handles displayed with the vector graphic 710 and the display 704 depicts point handles displayed with the vector graphic 710. The display 706 and the display 708 are also displayed with bone handles and point handles, respectively. The displays 706, 708 represent deformations made to the vector graphic 710 as a result of receiving user manipulation inputs in relation to the bone handles and point handles, respectively.

In particular, the display 706 represents deformations made to the vector graphic 710 responsive to receiving user manipulation inputs in relation to the bone handles. Responsive to receiving the user manipulation inputs in relation to the bone handles, for instance, the vector graphic 710 is modified from the version depicted at the display 702 to the version depicted at the display 704. In contrast, the display 708 represents deformations made to the vector graphic 710 responsive to receiving user manipulation inputs in relation to the point handles. Responsive to receiving the user manipulation inputs in relation to the point handles, for instance, the vector graphic 710 is modified from the version depicted at the display 704 to the version depicted at the display 708.

Differences between bone-handle-based deformations and point-handle-based deformations are illustrated in relation to portions 712, 714. Notably, local coherence of the portion 712 is preserved in the display 706 of the vector graphic 710. This is due to the rigid deformation of the portion 712 that corresponds to manipulation of bone handles. Unlike the portion 712, local coherence of the portion 714 is not preserved in the display 708 of the vector graphic 710. This is because the point handles allow freeform manipulation in any direction without lines in between them to maintain rigidity of local portions of the vector graphic 710, e.g., in relation to the lines.

It is to be appreciated that bone handles limit the deformations of graphic objects to preserve local coherence while point handles do not preserve such local coherence. This is due to connections of the bone-handle vertices to line segments, which are connected to other vertices. Thus, manipulation of a bone handle vertex also causes manipulation of at least one line segment, and the at least one line segment to rotate in relation to another vertex or the at least one line segment's length to change. Additionally, portions of the graphic object corresponding to the line segment are deformed in relation to the line segment.

Having discussed example details of the techniques for bone handle generation, consider now some example procedures to illustrate additional aspects of the techniques.

Example Procedures

This section describes example procedures for bone handle generation in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the computing device 102 of FIG. 1 or the system 200 of FIG. 2 capable of leveraging the bone handle generation system 114.

Figure 8:
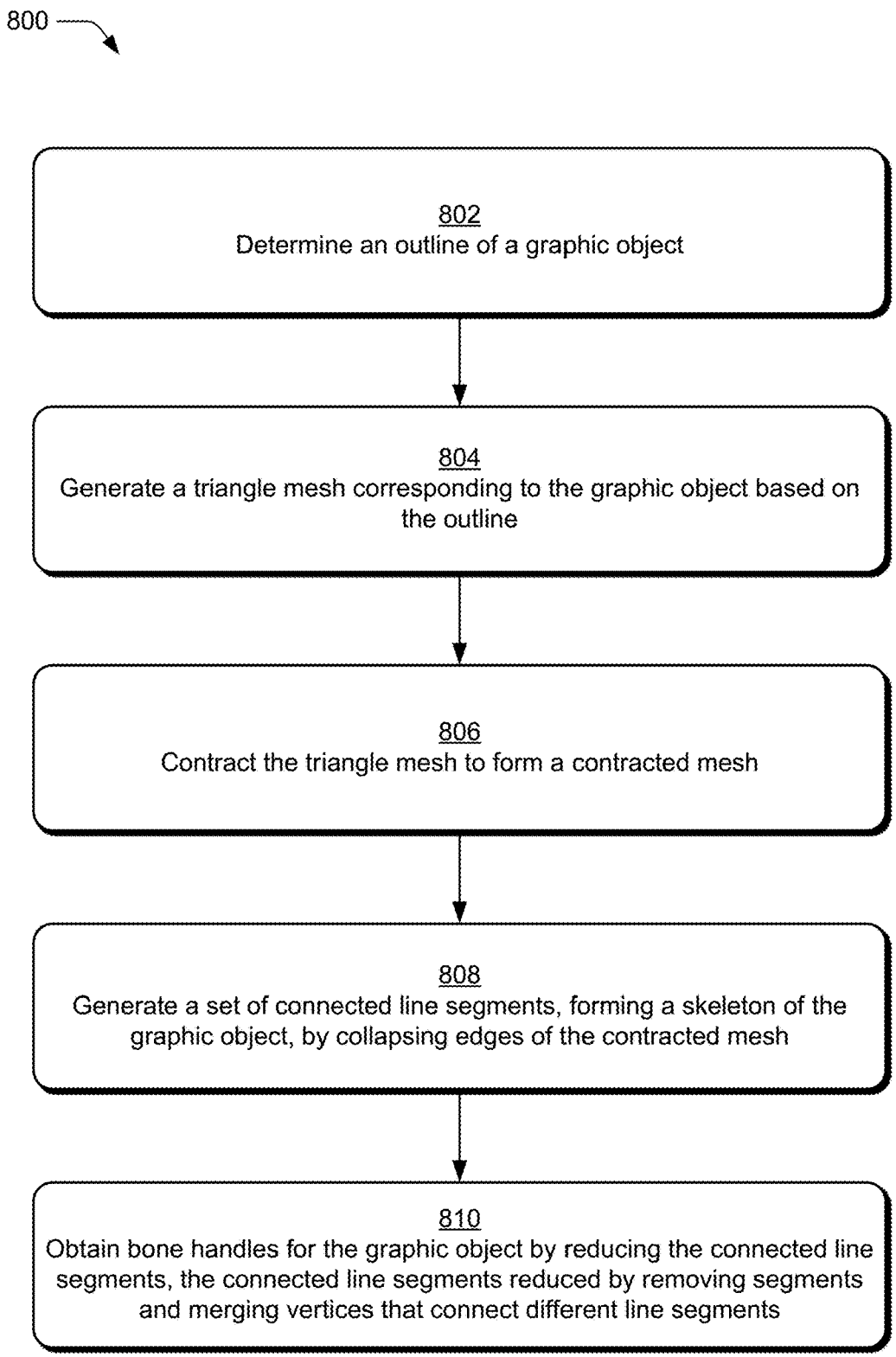
FIG. 8 depicts a procedure in an example implementation in which bone handles are generated for a graphic object.

FIG. 8 depicts an example procedure 800 in which bone handles are generated for a graphic object.

An outline of a graphic object is determined (block 802). By way of example, the triangle mesh module 202 determines an outline of the graphic object 112, such as by sampling the graphic object 112 to identify portions of the graphic object 112 that correspond to the outline (and portions that correspond to an interior of the graphic object 112).

A triangle mesh corresponding to the graphic object is generated based on the outline (block 804). By way of example, the triangle mesh module 202 generates the triangle mesh 212 based on the outline determined at block 802. In one or more implementations, the triangle mesh module 202 generates the triangle mesh 212 using one or more triangulation techniques in relation to the outline. These triangulation techniques may include, for instance, the Conforming Delaunay Triangulation procedure.

The triangle mesh is contracted to form a contracted mesh (block 806). By way of example, the mesh contraction module 204 contracts the triangle mesh 212 to form the contracted mesh 214. In one or more implementations, the mesh contraction module 204 contracts the triangle mesh 212 into the contracted mesh 214 by determining a contraction operator (e.g., a Laplace-Beltrami operator) of a surface discretized by the triangle mesh 212 and by contracting edges of the mesh in a direction and with a magnitude defined by normal determined using the contraction operator.

A set of connected line segments forming a skeleton of the graphic object is generated by collapsing edges of the contracted mesh (block 808). By way of example, the edge collapsing module 206 generates the connected line segments 216 by collapsing edges of the contracted mesh 214. In one or more implementations, the edge collapsing module 206 collapses the edges of the contracted mesh 214 iteratively until there are no remaining triangles—until only connected line segments remain. The edge collapsing module 206 collapses the edges iteratively, for instance, by identifying a lowest-cost merge of two vertices of the mesh as it persists at a start of a current iteration, merging the two vertices, and updating costs of merging vertices that neighbor the vertex formed by the merging. The edge collapsing module 206 may determine a cost of merging vertices of the triangle mesh according to the cost function discussed in more detail above.

Bone handles are obtained for the graphic object by reducing the connected line segments (block 810). In accordance with the principles discussed herein, the connected line segments are reduced by removing segments and merging vertices that connect different segments. By way of example, the segment reduction module 208 obtains the bone handles 210 by reducing the connected line segments 216. The segment reduction module 208 reduces the connected line segments 216 to the bone handles 210, for instance, by removing one or more of the connected line segments 216 and by merging vertices that connect different line segments 216.

Figure 9:
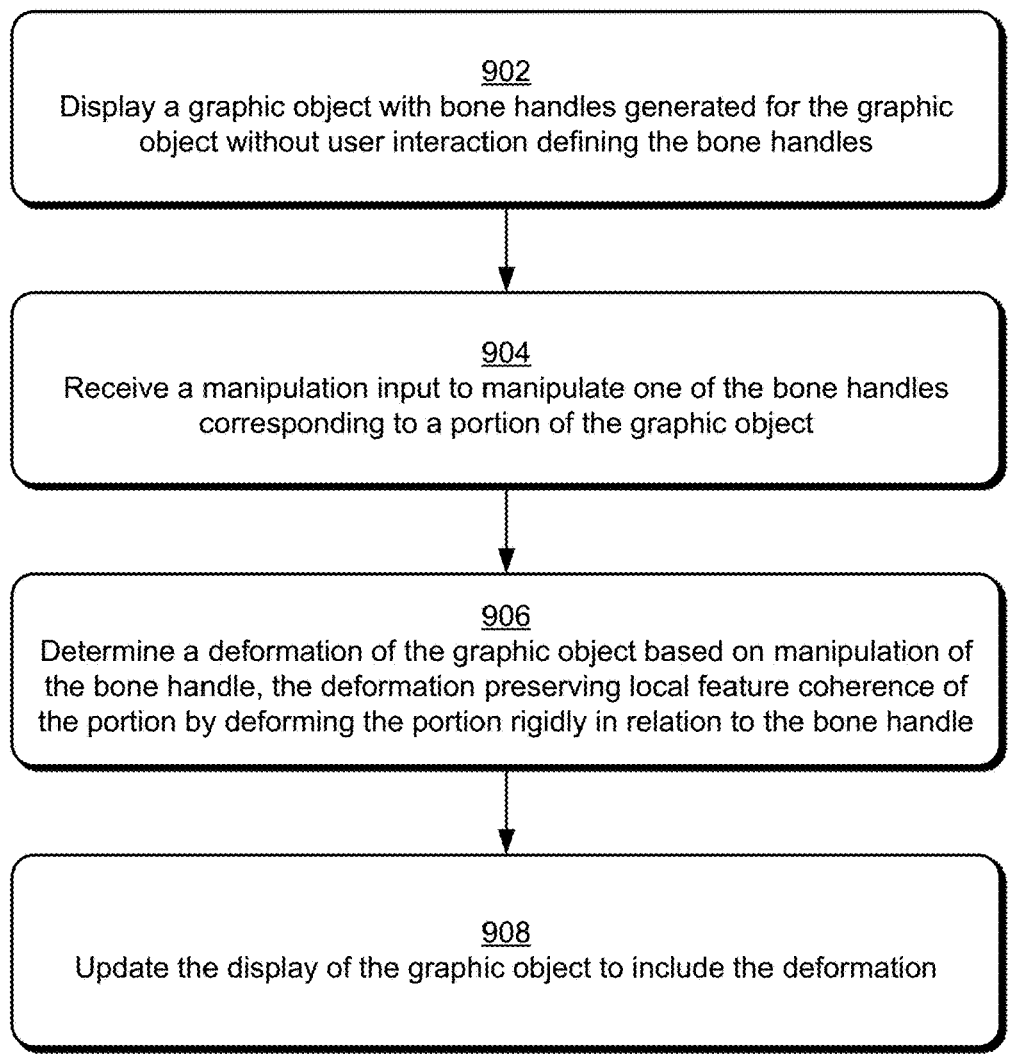
FIG. 9 depicts a procedure in an example implementation in which a portion of a graphic object is deformed based on user input relative to a bone handle.

FIG. 9 depicts an example procedure 900 in which a portion of a graphic object is deformed based on user input relative to a bone handle.

A graphic object is displayed with bone handles generated for the graphic object without user interaction defining the bone handles (block 902). By way of example, the bone handle generation system 114 generates the bone handles 508 for the vector graphic 502 without user interaction to define the bone handles 508—although a user selection may be received requesting to generate bone handles for the vector graphic 502. The bone handle generation system 114 generates the bone handles 508, for instance, in accordance with the procedure 800 discussed in relation to FIG. 8. In this example, the computing device 102 then displays the vector graphic 502 with the bone handles 508, such as at one of the stages 506, 602 using a display device and via a user interface of the content editing application 104.

A manipulation input is received to manipulate one of the bone handles corresponding to a portion of the graphic object (block 904). By way of example, the computing device 102 receives a manipulation input (e.g., via a mouse, touch functionality, stylus, and so forth), and via the user interface of the content editing application 104, to manipulate a bone handle 508 of the vector graphic 502, such as the manipulation input causing the cursor 606 to have been dragged 608 downward as depicted in the stage 604 and in relation to the cursor 606's position in the stage 602.

A deformation of the graphic object is determined based on manipulation of the bone handle (block 906). In accordance with the principles discussed herein, the deformation preserves local feature coherence of the portion of the graphic object by deforming the portion rigidly in relation to the bone handle. By way of example, the content editing application 104 determines a deformation of the vector graphic 502 based on the manipulation input received at block 904.

The display of the graphic object is updated to include the deformation (block 908). By way of example, the content editing application 104 causes the vector graphic 502 to be displayed via a user interface with the deformation determined at block 906. For instance, the content editing application 104 displays via a respective user interface the vector graphic 502 with the deformation depicted at the stage 604, e.g., with the portion of the vector graphic 502 at a different position and having a different shape than at the stage 602. In this way, the content editing application 104 may enable users to more efficiently manipulate presented controls to deform graphic object in ways that preserve local feature coherence, preventing the deformed graphic objects from appearing unnatural.

Having described example procedures in accordance with one or more implementations, consider now an example system and device that can be utilized to implement the various techniques described herein.

Example System and Device

Figure 10:
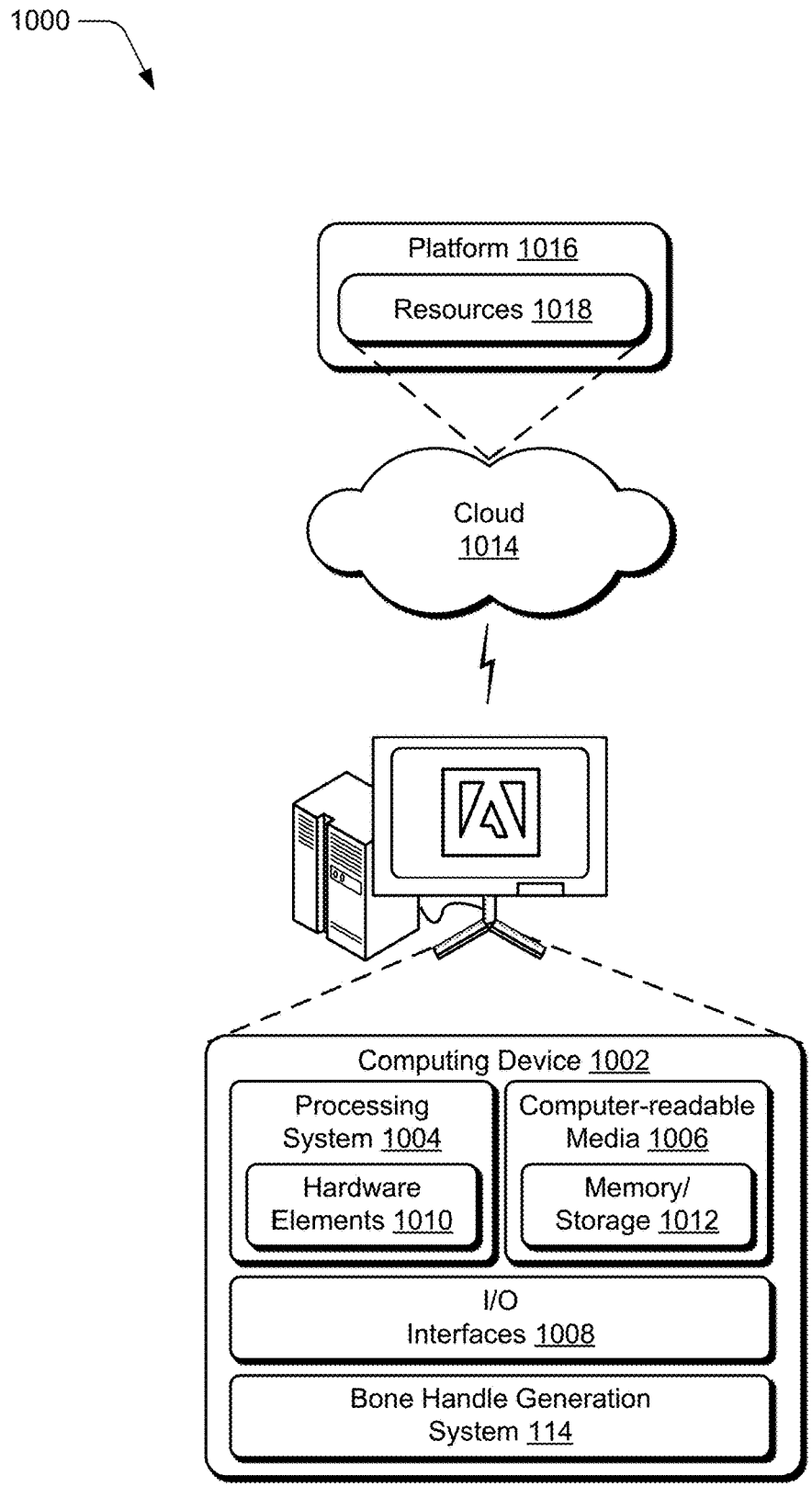
FIG. 10 illustrates an example system including various components of an example device that can be implemented as any type of computing device as described and/or utilized with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the bone handle generation system 114. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment, a method implemented by at least one computing device for enabling efficient deformation of vector graphics objects in a way that preserves local coherence of portions of the vector graphics objects affected by the deformation, the method comprising:
   determining, by the at least one computing device, an outline of a vector graphics object by sampling portions of the vector graphics object to identify whether sampled portions correspond to the outline or to an interior of the vector graphics object;
   generating, by the at least one computing device, a two-dimensional (2D) mesh corresponding to the vector graphics object based on the outline;
   contracting, by the at least one computing device, the 2D mesh to form a contracted mesh;
   generating, by the at least one computing device, a set of connected line segments forming a skeleton of the vector graphics object by collapsing edges of the contracted mesh; and
   obtaining, by the at least one computing device, bone handles for the vector graphics object by reducing the set of connected line segments, the bone handles being controllable with user input to deform corresponding portions of the vector graphics object.

2. A method as described in claim 1, further comprising reducing the set of connected line segments by at least one of removing a line segment or merging vertices that connect different line segments.

3. A method as described in claim 1, further comprising ranking the edges of the contracted mesh, wherein generating the set of connected line segments is based on the ranking.

4. A method as described in claim 1, wherein the 2D mesh is a triangle mesh.

5. A method as described in claim 4, wherein the triangle mesh is generated based on the outline according to a Conforming Delaunay Triangulation procedure.

6. A method as described in claim 1, wherein contracting the 2D mesh includes determining a contraction operator for the 2D mesh indicative of a magnitude and direction of the contracting to apply to vertices of the 2D mesh.

7. A method as described in claim 6, wherein the contraction operator is a Laplace-Beltrami operator.

8. A method as described in claim 1, wherein collapsing the edges of the contracted mesh includes iteratively determining costs to merge each connected vertex of the contracted mesh based on a cost function and merging two connected vertices having a lowest cost.

9. A method as described in claim 8, wherein the edges of the contracted mesh are collapsed until the edges of the contracted mesh no longer form any closed shapes.

10. A method as described in claim 1, further comprising:
   displaying the vector graphics object with the bone handles via a user interface;
   receiving a user-manipulation input to manipulate one of the bone handles;
   determining a deformation of the vector graphics object based on manipulation of the one bone handle;
   deforming the vector graphics object based on the determining to produce a deformed vector graphics object having the deformation; and
   displaying the deformed vector graphics object.

11. A method as described in claim 1, further comprising:
   receiving user input to define a new bone handle; and
   adding the new bone handle to the bone handles.

12. A method as described in claim 1, further comprising:
   receiving user input identifying at least one of the bone handles for removal; and
   removing the at least one bone handle.

13. In a digital medium environment, a system for enabling efficient deformation of vector graphics objects in a way that preserves local coherence of portions of the vector graphics objects affected by the deformation, the system comprising:
   a mesh module, implemented at least partially by a processor of a computing device executing computer-readable instructions stored in memory, to generate a two-dimensional (2D) mesh corresponding to a vector graphics object based on an outline of the vector graphics object, the mesh module further configured to sample portions of the vector graphics object to identify whether sampled portions correspond to the outline or an interior of the vector graphics object and determine the outline of the vector graphics object based on the sampled portions;
   a mesh contraction module, implemented at least partially by the processor of the computing device executing the computer-readable instructions, to contract the 2D mesh to form a contracted mesh;
   an edge collapsing module, implemented at least partially by the processor of the computing device executing the computer-readable instructions, to generate a set of connected line segments forming a skeleton of the vector graphics object by collapsing edges of the contracted mesh; and
   a segment reduction module, implemented at least partially by the processor of the computing device executing the computer-readable instructions, to obtain bone handles for the vector graphics object by reducing a number of the connected line segments, the bone handles being controllable with user input to deform corresponding portions of the vector graphics object.

14. A system as described in claim 13, wherein the mesh module is further configured to generate the 2D mesh as a triangle mesh corresponding to the vector graphics object.

15. A system as described in claim 13, further comprising a content editing application configured to:
   cause display of the vector graphics object with the bone handles via a user interface of the content editing application;

receive user input via the user interface to manipulate one of the bone handles;

determine a deformation of a portion of the vector graphics object corresponding to the one bone handle based on the user input to manipulate the one bone handle; and cause an update of the display of the vector graphics object to include the deformation.

16. A system as described in claim 13, wherein the mesh module is further configured to:

generate the 2D mesh within the outline of the vector graphics object.

17. One or more non-transitory computer-readable storage media having instructions stored thereon that are executable by one or more processors to perform operations comprising:

determining, by the at least one computing device, an outline of a vector graphics object by sampling portions of the vector graphics object to identify whether sampled portions correspond to the outline or to an interior of the vector graphics object;

generating, by the at least one computing device, a two-dimensional (2D) mesh corresponding to the vector graphics object based on the outline;

contracting, by the at least one computing device, the 2D mesh to form a contracted mesh;

generating, by the at least one computing device, a set of connected line segments forming a skeleton of the vector graphics object by collapsing edges of the contracted mesh; and obtaining, by the at least one computing device, bone handles for the vector graphics object by reducing the set of connected line segments, the bone handles being controllable with user input to deform corresponding portions of the vector graphics object.

18. One or more non-transitory computer-readable storage media as described in claim 17, wherein the operations further comprise:

displaying the vector graphics object with the bone handles via a user interface;

receiving a user-manipulation input to manipulate one of the bone handles;

determining a deformation of the vector graphics object based on manipulation of the one bone handle;

deforming the vector graphics object based on the determining to produce a deformed vector graphics object having the deformation; and displaying the deformed vector graphics object.

19. One or more non-transitory computer-readable storage media as described in claim 17, wherein the operations further comprise:

receiving user input to define a new bone handle; and adding the new bone handle to the bone handles.

20. One or more non-transitory computer-readable storage media as described in claim 17, wherein the operations further comprise:

receiving user input identifying at least one of the bone handles for removal; and removing the at least one bone handle.

* * * * *